United States Patent [19]

Koch

[11] Patent Number: 4,844,059
[45] Date of Patent: Jul. 4, 1989

[54] METHOD AND APPARATUS FOR ENRICHING RESPIRATORY GAS WITH OXYGEN AND DELIVERING IT TO A PATIENT

[75] Inventor: Jochim Koch, Hollenbek, Fed. Rep. of Germany

[73] Assignee: Draegerwerk AG, Fed. Rep. of Germany

[21] Appl. No.: 5,093

[22] Filed: Jan. 20, 1987

[30] Foreign Application Priority Data

Jan. 22, 1986 [DE] Fed. Rep. of Germany ....... 3601714

[51] Int. Cl.$^4$ ................................................ A62B 7/00
[52] U.S. Cl. ........................... 128/205.12; 128/205.24; 128/205.27; 55/21; 55/68
[58] Field of Search .............. 128/202.26, 204.18, 128/205.11, 205.12, 205.24, 205.27; 55/21, 25, 26, 58, 62, 68, 74, 163, 179, 196, 161

[56] References Cited

U.S. PATENT DOCUMENTS

| | | | |
|---|---|---|---|
| 3,922,149 | 11/1975 | Rudev et al. | 55/21 |
| 4,222,750 | 9/1980 | Gauthier et al. | 55/62 |
| 4,263,014 | 4/1981 | McCombs et al. | 55/25 |
| 4,428,372 | 1/1984 | Beysel et al. | 128/205 R |
| 4,491,489 | 1/1985 | Pinkerton | 55/179 |
| 4,499,990 | 5/1987 | Tedford, Jr. | 55/26 |
| 4,561,865 | 12/1985 | McCombs et al. | 55/25 |
| 4,594,080 | 6/1988 | Tremgn et al. | 55/179 |
| 4,681,099 | 7/1987 | Sato et al. | 55/74 |
| 4,698,075 | 10/1987 | Dechene | 55/179 |

FOREIGN PATENT DOCUMENTS 2837281 3/1980 Fed. Rep. of Germany ....................... 128/205.27

Primary Examiner—Max Hindenburg
Assistant Examiner—K. M. Reichle
Attorney, Agent, or Firm—McGlew & Tuttle

[57] ABSTRACT

An apparatus for enriching respiratory gas with oxygen, wherein the entire enriched respiratory gas can be taken from an absorber bed and the enrichment concentration is adjustable by action on the total flow through the adsorber and the portion of the total flow in excess of the consumer flow is removable via an outflow, is improved so that adjustment of enrichment concentration and consumer flow independently of each other is possible and the enrichment concentration is maintained also at fluctuating consumer flow. To this end a control circuit for the stabilization of the set enrichment concentration is provided, to which is connected a control section for the adjustment of the consumer flow, and an outflow being is arranged at the junction between the control circuit and the control section.

7 Claims, 1 Drawing Sheet

METHOD AND APPARATUS FOR ENRICHING RESPIRATORY GAS WITH OXYGEN AND DELIVERING IT TO A PATIENT

FIELD AND BACKGROUND OF THE INVENTION

This invention relates in general to respirators and in particular to a new and useful apparatus and method for enriching respiratory gas with oxygen.

The invention relates particularly to an apparatus for enriching respiratory gas with oxygen, wherein the entire respiratory gas is taken from an adsorber bed and the enrichment concentration is adjustable by action on the total flow through the adsorber and the portion of the total flow in excess of the consumer flow is removable through an outflow. A similar apparatus is known from German OS No. 28 37 281.

In the known apparatus, the respiratory gas to be enriched with oxygen is conducted through adsorption beds in which the nitrogen is retained and the respiratory gas thus enriched with oxygen can be supplied to the consumer. The proportion of nitrogen retained by the adsorption beds depends essentially on the quantity of gas flowing through the adsorber. With increasing flow the adsorption of nitrogen and hence the enrichment with oxygen decreases. Conversely it follows that at higher amounts of enriched respiratory gas removed by the consumer necessarily the oxygen proportion in the respiratory gas decreases. In a corresponding manner, the oxygen proportion increases when the removal of respiratory gas decreases. Now in the known apparatus the respiratory gas stream enriched with a crrtain oxygen concentration is, as as it leaves the adsorber bed, first collected in a buffer volume. A discharge line is connected to the buffer release and it contains an outflow valve to the atmosphere.

Through the outflow valve a total flow of respiratory gas through the adsorption bed can be adjusted, whereby a certain oxygen concentration in the enriched respiratory gas is established. The buffer volume is connected also, via a control valve, to the consumer line, through which the variable consumption of respiratory gas can be taken from the buffer volume. Thus the oxygen concentration is determined jointly by the variable respiratory gas consumption and the quantity of respiratory gas delivered via the outflow valve. As the quantity taken out of the buffer volume by the consumer changes the enrichment concentration in the respiratory gas mixture also changes.

SUMMARY OF THE INVENTION

The present invention provides an improved apparatus for enriching respiratory gas with oxygen in such a way that adjustment of enrichment concentration and consumer flow independently of each other is possible and the enrichment concentration is maintained also at a fluctuating consumer flow.

In accordance with the invention a control circuit for the stabilization of the present enrichment concentration is provided, to which is connected a control section for the adjustment of the consumer flow. An outflow is disposed at the junction between the control circuit and the control section.

The advantage of the invention resides essentially in that a mutually independent adjustment of the desired oxygen enrichment concentration and of the consumer flow is possible. The oxygen concentration in the enriched respiratory gas is determined by the total flow through the adsorber bed and remains constant even if the consumer flow in the control section is changed. The surplus of total flow in excess of the consumer flow is discharged behind the control circuit. Thus it is possible, for one thing, to adjust different oxygen concentrations in the control circuit at constant consumer flow and, for another, to select a different consumer flow at constant enrichment concentration. Thus one obtains in a simple manner an oxygen mixer in conjunction with an apparatus for enriching respiratory gas with oxygen which makes it possible within the capacity limits of the adsorption bed, to variably adjust the desired oxygen concentration and the consumer flow.

In an especially simple manner a control circuit comprises an auxiliary pressure controlled control circuit pressure reducer, an adjustable control circuit throttle, and a control circuit flowmeter, while the control section comprises a control section pressure reducer, a following adjustable control section pressure reducer, a following adjustable control section throttle, and a consumption flowmeter. The control circuit flowmeter is connected on the exit side via a feedback line to the control pressure space of the control circuit pressure reducer. This feedback makes sure that the input pressure of the control circuit made available by the control circuit pressure reducer, is higher by a fixed difference value than the output pressure behind the control circuit flowmeter. The pressure gradient and hence also the total flow at the control circuit throttle are thus maintained as set. The control circuit flowmeter permits an indirect indication of concentration. For the sake of simplification, however, it may be omitted, and, as a substitute, the setting element of the control circuit may then be provided with concentration marks.

The outflow can expediently be formed in that between the control circuit and control section a storage vessel with a pressure control valve is connected.

Alternatively, the arrangement may be such that there is connected to the control circuit a consumption flowmeter, at the exit side of which the consumer flow is conducted to the consumer via a consumer line. The outflow to the atmosphere is established by an adjustable control sector throttle, which branches off between the control circuit and the consumer flowmeter from the connecting line thereof. Adjustment of the outgoing flow brings about a corresponding adjustment of the consumer flow. With the control section throttle completely closed, the entire respiratory gas flow traversing the adsorption bed is conducted to the consumer. The desired oxygen concentration is then adjusted by the control circuit throttle. With the control section throttle completely open, only a small flow of enriched respiratory gas flows to the consumer, the quantity of which is determined by the internal resistances of the control section throttle and consumption flowmeter.

For the stabilization of the flow quantities at varying consumer resistances a control section pressure reducer may appropriately be inserted in the control section between thecontrol circuit and the outflow and be connected via an additional feedback line to the consumer line.

Accordingly, an object of the present invention is to provide a method for enriching respiratory gas with oxygen, controlling its setting and stabilizing the predetermined enrichment concentration in a total flow of the respiratory gas, simultaneously controlling the flow of the gas so as to vary the amount directed to be consumed by a patient and discharging a portion of the flow in accordance with the controls of enrichment and flow.

A further object of the invention is to provide an apparatus for enriching respiratory gases with oxygen and which is supplied to a patient in a consumer flow for use with an absorber bed oxygen enriching apparatus which produ es a total respiratory gas flow in excess of the flow to be consumed and which comprises an outflow connected from the apparatus for moving a portion of the total flow which is in excess of the flow being consumed, a control circuit for setting and stabilizing a set enrichment concentration in said total flow, a consumer flow control section connected to said control circuit for adjustment of the consumer flow and an outflow connection connected between said control circuit and said consumer flow control section.

A further object of the invention is to provide an apparatus for enriching respiratory gases with oxygen which provides a desired flow of enrichment gases and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 3:
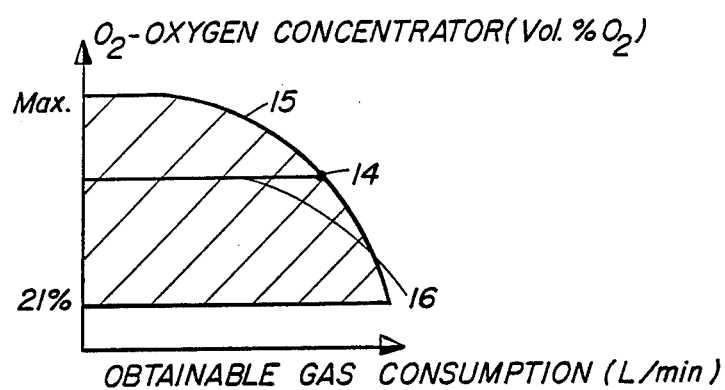
FIG. 3 is a diagram representing the adjustment range for consumer flow and oxygen.

Referring to the drawings in particular the invention embodied therein comprises an apparaus for enriching respiratory gases with oxygen which is supplied to a patient in a consumer flow for use with an adsorber bed oxygen enriching apparatus 1 which produces a total respiratory gas flow in excess of the flow to be consumed. An outflow 17 is connected to the apparatus for removing a portion of the total flow which is in excess of the flow being consumed. A control circuit having control elements in the form of a pressure reducer 3, throttle 4 and a flowmeter 5 is connected directly to the enriching apparatus. A consumer flow control section has similar elements including a pressure reducer 8, a throttle 9 and a flowmeter 10. In accordance with one embodiment of the invention, the outflow connection 17 is made between the control circuit and the control section.

Figure 1:
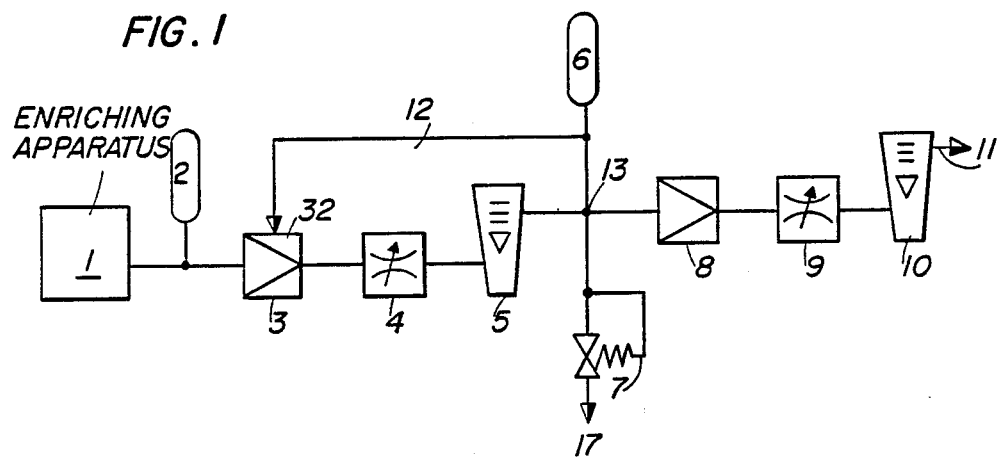
FIG. 1 is a circuit diagram of a first form of realization with an outflow between a control circuit and a control section constructed in accordance with the invention.

In accordance with the method of the invention the respiratory gas is enriched in an enriching device so as to produce flow in excess of the flow to be consumed by the patient and an outflow is connected between a control circuit for setting and stabilizing an enrichment concentration in the total flow and a control section which adjusts the consumer flow and a portion of the gases are directed out through the outflow in accordance with the operation of the two control circuits. In FIG. 1, an apparatus 1 for enriching respiratory gas with oxygen is connected on its exit side with a control circuit pressure reducer 3 and a pressure accumulator 2. The enrichment apparatus 1 is supplied for example with ambient air, from which the nitrogen component is retained by means of absorption beds, so that the entire oxygen enriched respiratory gas stream is conducted through the control circuit pressure reducer 3 and an adjustable control circuit throttle 4 then through a control circuit flowmeter 5 to the junction 13.

With the control circuit including control circuit throttle 4 a total flow thruogh the absorption beds is adjustable, so that thereby the oxygen concentration in the enriched respiratory gas is established. The oxygen enrichment apparatus 1 then operates on the operating point 14 of its characteristic curve 15 illustrated in FIG. 3. Branching off from the junction 13 is an outflow line 17 in which there is a pressure control valve 7. A storage vessel 6 as well as a feedback line 12 are connected at the junction 13. In the storage space 6 can be stored the respiratory gas quantity exceeding the respiratory gas consumption, before additional surplus is given off to the atmosphere via the outflow 17.

The control circuit pressure reducer 3 is an auxiliary pressure controlled model. It has a setting spring space 3a which provides a space for a control pressure which is closed off from the surrounding. The feedback line 12 is connected to the control pressure space 3a of the control circuit pressure reducer 3. Owing to this, the back pressures of the control circuit pressure reducer 3 always lies above the system pressure prevailing at the junction 13 by a difference value given by the adjustment of the setting spring. The control section following the junction 13 comprises a control section pressure reducer 8, an adjustable control section throttle 9 and a consumption flowmeter 10, all being connected one behind the other in series. With the control section throttle 9, the consumer flow need.de for the consumer line 11 is adjustable. Thus the maximum attainable total flow as it is supplied according to the characteristic curve 15 of FIG. 3 and the operating point 14 of the oxygen enrichment appparatus and stabilized by the control circuit, is adjustable to the desired consumer flow along the operating line 16 by means of the control section throttle 9.

Figure 2:
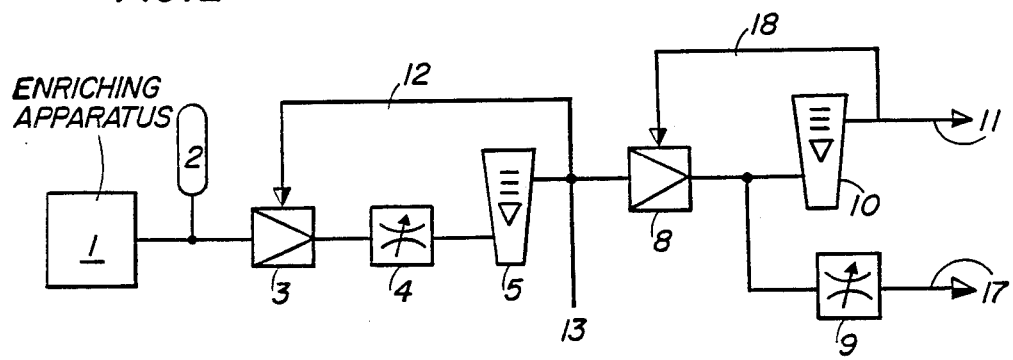
FIG. 2 is a circuit of another embodiment of the invention with outflow after the control-section pressure reducer.

In FIG. 2, the control section following junction 13 comprises a control section pressure reducer 8, which is followed by consumption flowmeter 10 to which the consumer line 11 is connected. The outflow line 17 is disposed between the control section pressure reducer 8 and consumption flowmeter 10 and contains the adjustable control section throttle 9. A second feedback line 18 is connected between the consumer line 11 and the control section pressure reducer 8 in the same manner as the first feedback line 12. The adjustment of the desired oxygen concentration in the respiratory gas is also adjusted via the adjustable control circuit throttle 4 in the control circuit. By the control section throttle 9 the quantity of gas flowing out of the outflow line 17 into the atmosphere can be regulated, whereby the consumer flow delivered in the consumer line 11 is determined.

In the diagram of FIG. 3 the oxygen concentration attainable with the oxygen enrichment apparatus 1 is plotted versus the obtainable respiratory gas consumption. By the total flow through the apparatus adjustable with the control circuit throttle 4 the maximum attainable oxygen enrichment concentration is set along the characteristic curve 15. At a chosen operating point 14 the prevailing maximum total flow can be divided with the aid of the second adjustable control section throttle 9 along the operating line 16. By varying the oxygen concentration and hence the selection of different operating points along the characteristic curve 15, as well as by simultaneous adjustment of the consumer flow with the second control section throttle 9 the concentration and flow in the consumer line 11 can be regulated in the entire hatched area below the characteristic curve 15.

While specific embodiments of the invention have been shown and described in detail to illustrate the application of the principles of the invention, it will be understood that the invention may be embodied otherwise without departing from such principles.

What is claimed is:

1. An apparatus for enriching respiratory gas for a patient with oxygen comprising: adsorber bed oxygen enrichment means for producing a total enriched respiratory gas flow in excess of the flow to be delivered to the patient having an inlet for drawing in air and an outlet for said flow of enriched respiratory gas; control circuit means having an outlet and having an inlet connected to said adsorber bed means outlet, said control circuit means for independently controlling the rate of flow of air into said adsorber bed means and the rate of flow of enriched respiratory gas out of said adsorber bed means to establish the total flow of enriched respiratory gas and thereby the oxygen concentration in the enriched respiratory gas; control section means having an outlet adapted for connection to the patient and an inlet connected to the outlet of said control circuit means for independent adjustment of the flow to be delivered to the patient; a junction formed at the inlet of said control section means and the outlet of said control circuit means; and, outflow means connected at said junction for removing the portion of the total gas flow which is in excess of the flow to be delivered to the patient.

2. An apparatus according to claim 1, wherein:
said control circuit means includes an auxiliary pressure-controlled pressure reducer having an inlet which defines said inlet of said control circuit means, space means for controlling the pressure produced by said pressure reduced and an outlet; an adjustable control circuit throttle having an inlet connected to said outlet of said pressure reducer and an outlet connected to the outlet of said control circuit means; and, a control circuit flowmeter connected in series with the pressure reducer and the throttle downstream of said pressure reducer; and a feedback line connects said outlet of said control circuit means and said space means to control said pressure reducer in dependence on the pressure at said control circuit means outlet 3. An apparatus for enriching respiratory gas according to claim 1, wherein: said control section means includes a control section pressure reducer havinq an inlet which defines said control section means inlet and an outlet; an adjustable control section throttle having an inlet connected to said control section pressure reducer outlet and an outlet connected to said control section means outlet; and, a consumption flowmeter connected in series with said control section throttle and said control section pressure reducer downstream of said control section pressure reducer.

4. An apparatus for enriching respiratory gas according to claim 1, wherein: said outflow means comprises an accummulator connected at said junction formed at the inlet of said control section means and the outlet of said control circuit means and pressure control valve means connected to said junction for controlling the outflow from the apparatus in response to the junction pressure at said junction.

5. An apparatus for enriching respiratory gas according to claim 1, wherein: said control circuit means includes a control circuit pressure-controlled pressure reducer having an inlet which defines said control circuit means inlet, space means for controlling the pressure produced by said pressure reducer, and an outlet; an adjustable control circuit throttle having an inlet connected to said control circuit pressure reducer outlet and an outlet connected to the outlet of said control circuit means; and, a control circuit flowmeter connected in series with said pressure reducer and said throttle downstream of said pressure reducer; a feedback line connects said control circuit means outlet to said space means of said pressure reducer to control said pressure reducer in dependence on the fluid pressure at the control circuit means outlet; and, said control section means includes a control section pressure reducer having an inlet which defines said control section means inlet and an outlet; an adjustable control section throttle having an inlet connected to said control section pressure reducer outlet and an outlet connected to said control section means outlet; and, a consumption flowmeter connected in series with said control section pressure reducer and said control section throttle downstream of said control section pressure reducer.

6. An apparatus for enriching respiratory gas according to claim 1, wherein said control circuit means includes a control circuit pressure-controlled pressure reducer having an inlet which defines said control circuit means inlet, space means for controlling the pressure produced by the pressure reducer, and an outlet; an adjustable control circuit throttle having an inlet connected to said control circuit pressure reducer outlet and an outlet connected to the outlet of said control circuit means; and, a control circuit flowmeter connected in series with said pressure reducer and said throttle downstream of said pressure reducer; a feedback line connects said control circuit means outlet to said space means of said pressure reducer to control the pressure reducer in dependence on the fluid pressure at the control circuit means outlet; and, said outflow means includes pressure controlled valve means connected to said junction for controlling the outflow from the apparatus in response to the pressure at said junction; and, an accumulator connected to said junction.

7. An apparatus for enriching respiratory gas for a patient with oxygen comprising adsorber bed oxygen enrichment means for producing a total enriched respiratory gas flow in excess of the flow to be delivered to a patient having an inlet for drawing in air and an outlet for said flow of enriched respiratory gas; an oxygen concentration control circuit having a control circuit fluid inlet connected to the absorber bed means outlet and a control circuit fluid outlet; said control circuit including a control circuit pressure-controlled pressure reducer having an inlet which defines said control circuit fluid inlet, space means for controlling the pressure produced by said pressure reducer, and an outlet; an adjustable control circuit throttle having an inlet connected to said control circuit pressure reducer outlet and an outlet connected to said control circuit fluid outlet; and, a flowmeter connected in series with said control circuit pressure reducer and said control circuit throttle downstream of said control circuit pressure reducer; a junction formed at the outlet of said control circuit; a feedback line connecting said junction to said space means to control said pressure reducer in dependence on the pressure at said junction; a patient flow control section having a control section inlet connected to said junction and having a control section outlet adapted for connection to the patient; said control section including a control section pressure reducer having an inlet which defines said control section inlet and an outlet; an adjustable control section throttle having an inlet connected to said control section pressure reducer outlet and an outlet connected to said control section outlet, and a control section flowmeter connected in series with said control section pressure reducer and said control section throttle downstream of said control section pressure reducer; and, outflow means connected to said junction for removing the portion of the total as flow which is in excess of the flow to be delivered to the patient.

* * * * *